United States Patent

[11] 3,550,935

| [72] | Inventors | William E. Smith<br>Upper Saddle River, N.J.;<br>Edward P. Primosch, Franklin Square,<br>N.Y.; John D. Keenan, Jr., Caldwell, N.J. |
|---|---|---|
| [21] | Appl. No. | 765,317 |
| [22] | Filed | Oct. 7, 1968 |
| [45] | Patented | Dec. 29, 1970 |
| [73] | Assignee | Amsco Packaging Machinery, Inc.<br>a corporation of New York |

[54] BAG DELIVERY AND STACKING MECHANISM FOR BAG-MAKING MACHINE
2 Claims, 10 Drawing Figs.

[52] U.S. Cl. .................................................. 271/76, 271/86
[51] Int. Cl. ...................................................... B65h 29/14, B65h 29/70
[50] Field of Search .......................................... 271/76, 89, 86

[56] References Cited
UNITED STATES PATENTS

| 560,215 | 5/1896 | Hall | 271/89 |
| 1,554,590 | 9/1925 | McGarvin | 271/89 |
| 2,101,328 | 12/1937 | Broadmeyer | 271/68 |
| 2,133,727 | 10/1938 | Staude | 271/76 |
| 2,664,731 | 1/1954 | Griffin | 271/76X |
| 2,843,377 | 7/1958 | Battersby | 271/76 |

FOREIGN PATENTS

| 400,476 | 8/1924 | Germany | 271/86 |

*Primary Examiner*—Evon C. Blunk
*Assistant Examiner*—Joseph Wegbreit
*Attorney*—Breitenfeld & Levine ABSTRACT: Delivery and stacking mechanism, particularly for plastic bags, includes a pair of conveyors one above the other. The top conveyor comprises a series of ropes trained over two rollers, and the bottom conveyor comprises an elastic belt trained over two rollers. Bottom roller at conveyor delivery end has grooves in registry with ropes above, and latter press elastic belt into grooves to corrugate bags passing between conveyors. Distance between rollers at delivery end of conveyors can be varied to vary depth of bag corrugation. Tray at delivery end of conveyors in which bags are stacked, openable gate on tray permitting removal of stack.

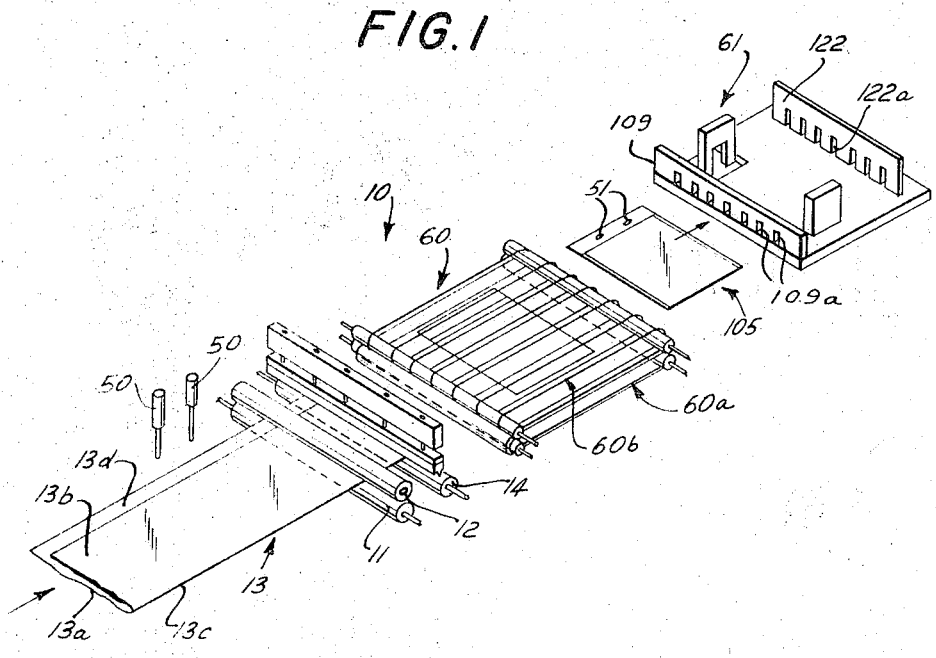
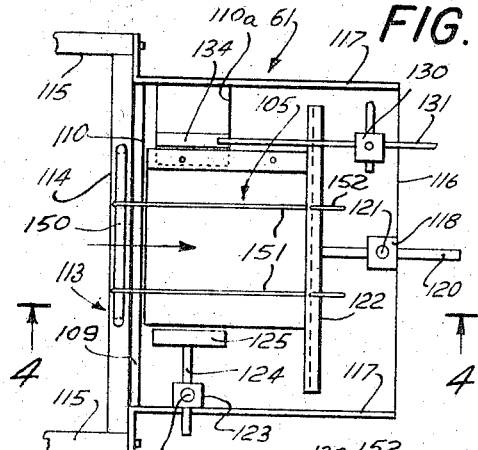
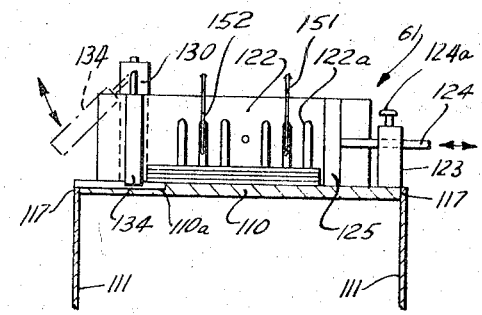
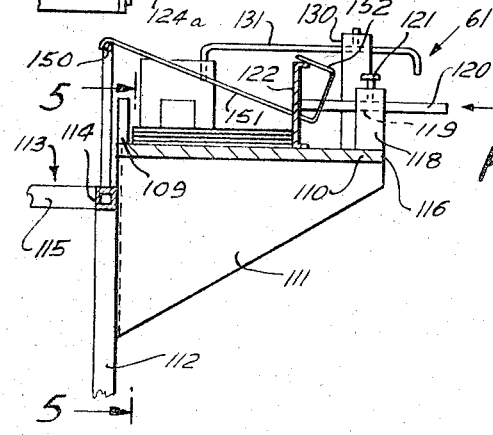

INVENTORS:
WILLIAM E. SMITH
EDWARD P. PRIMOSCH
JOHN D. KEENAN, JR.
BY Breitenfeld & Levine
ATTORNEYS

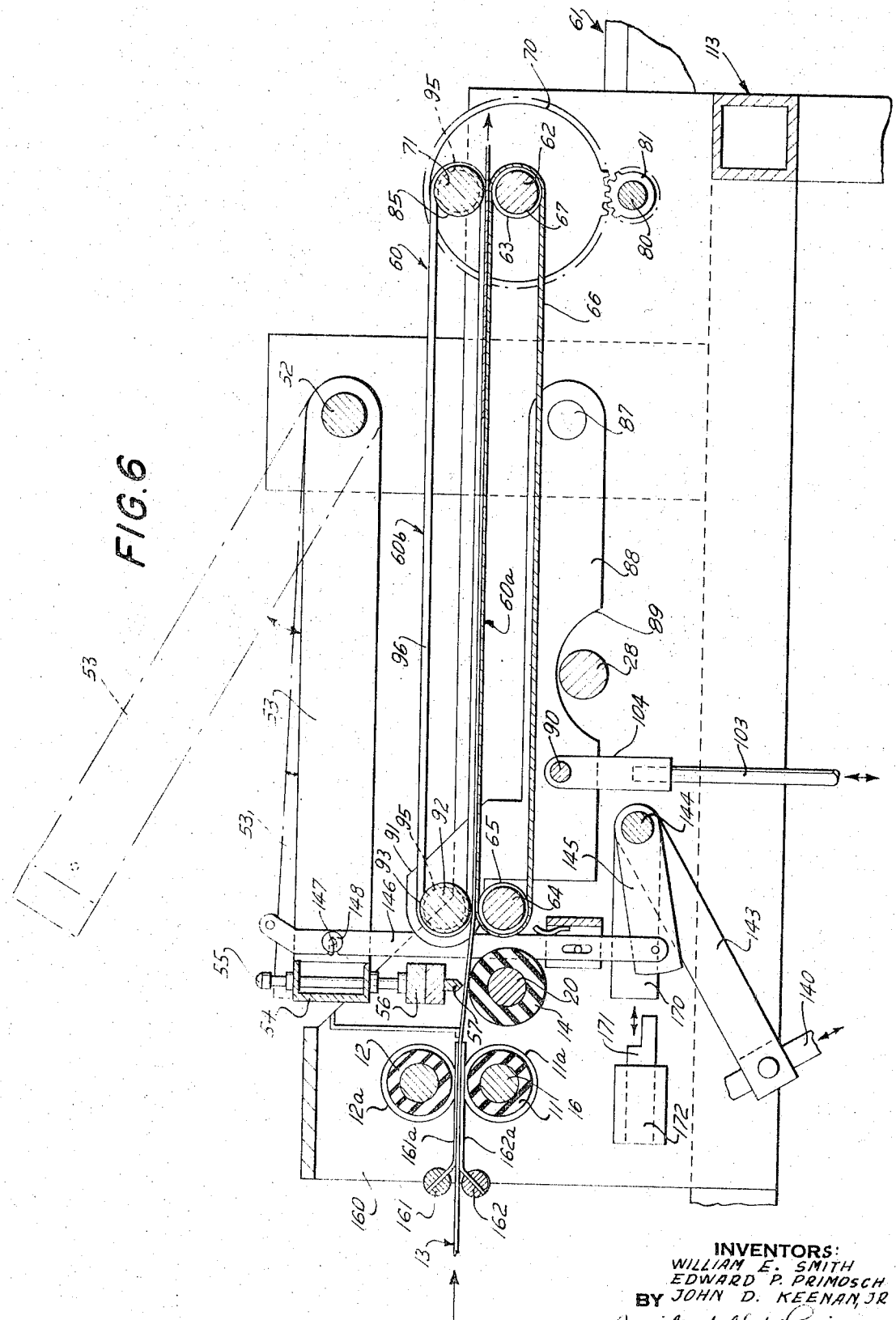

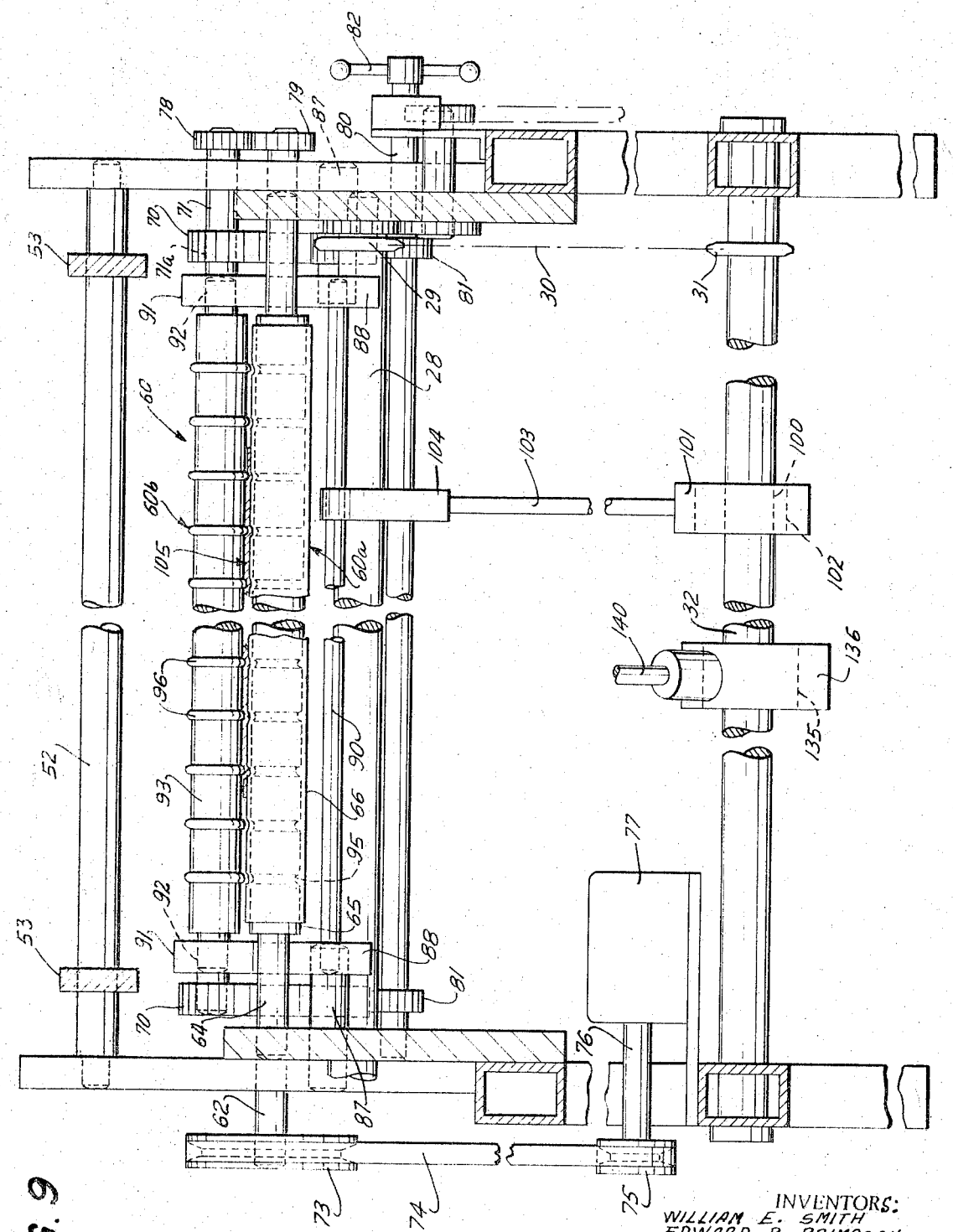

INVENTORS:
WILLIAM E. SMITH
EDWARD P. PRIMOSCH
BY JOHN D. KEENAN, JR.

Breitenfeld & Levine
ATTORNEYS

BAG DELIVERY AND STACKING MECHANISM FOR BAG-MAKING MACHINE

This invention relates to means for conveying bags, especially plastic bags, from a bagmaking machine to a tray where the bags are stacked and from which the stacks of bags may be removed.

In common practice, plastic bags for packaging merchandise are provided in stacks, and the stacks placed in bag-loading devices in which the bags are filled one-by-one. For successful use in a bag-loading device, the bags in each stack must be in near perfect registry one above another. Due to the limp and slippery nature of the bags, it is difficult not only to maintain them in a registered stack, but even more difficult to initially form such a stack at the delivery end of a bagmaking machine.

Consequently, it is an object of the present invention to provide a bag delivery and stacking mechanism capable of successfully forming a stack of bags made of limp material, in which the individual bags are in registry with each other.

It is a more specific object of the invention to provide a bag delivery mechanism in which each bag is temporarily corrugated, the corrugations extending parallel to the direction of travel of the bags, to stiffen the bags during the final portion of their movement from the delivery means to the stacking receptacle.

It is another object of the invention to provide means for adjusting the depth of corrugation so that the mechanism may operate successfully on bags formed of material differing in thickness.

It is a further object of the invention to provide a stacking tray capable of accommodating bags of different sizes.

It is an additional object of the invention to provide a stacking tray designed to permit removal of a bag stack quickly and conveniently.

To achieve these objectives, the invention provides a pair of superposed delivery conveyors, the upper conveyor being formed of a plurality of individual continuous ropes trained about two rollers. The rollers are spaced apart in the direction of bag movement, and their axes are perpendicular to this direction The lower conveyor comprises a continuous belt of stretchable material trained around two rollers parallel to the upper conveyor rollers. The lower conveyor roller at the delivery end of the conveyors is formed with grooves in registry with the ropes of the conveyor above, and the delivery-end rollers are arranged close enough together so that the ropes press the elastic belt of the lower conveyor into the grooves. Consequently, as each bag moving between the conveyors leaves the delivery end, the ropes of the upper conveyor deform the bag along parallel lines in the direction of bag movement, thereby corrugating the bag. The stiffened bag is then thrown by the conveyors against the back wall of a tray, and because of its temporary stiffness it does not fold or bend and hence lies flat with one edge against the tray wall. The inherent resilience of the bag material soon causes the corrugations to disappear.

The back wall of the tray is adjustable in a direction parallel to bag movement, and at least one sidewall of the tray, and preferably both, are adjustable in a direction perpendicular to bag movement. In this way, mutually perpendicular walls of the tray can be positioned to guide mutually perpendicular edges of each bag, as the latter is delivered, and thus assure a perfectly registered stack. One sidewall of the tray includes a gate which may be swung open to permit a bag stack to be removed from the tray.

Additional features and advantages of the invention will be apparent from the following description in which reference is made to the accompanying drawings.

In the drawings:

FIG. 1 is a perspective view illustrating the position of a delivery and stacking mechanism according to this invention, in relation to a portion of a bag making machine;

FIG. 3 is a top plan view of the stacking tray;

FIG. 4 is a cross-sectional view taken on line 4—4 of FIG. 3;

FIG. 5 is a cross-sectional view taken on line 5—5 of FIG. 4;

FIG. 6 is a vertical cross-sectional view through the conveyors and the feed and sealing and severing portions of the bag making machine;

FIG. 9 is a vertical cross-sectional view through a bagmaking machine looking into the receiving end of the conveyors.

Figure 2:
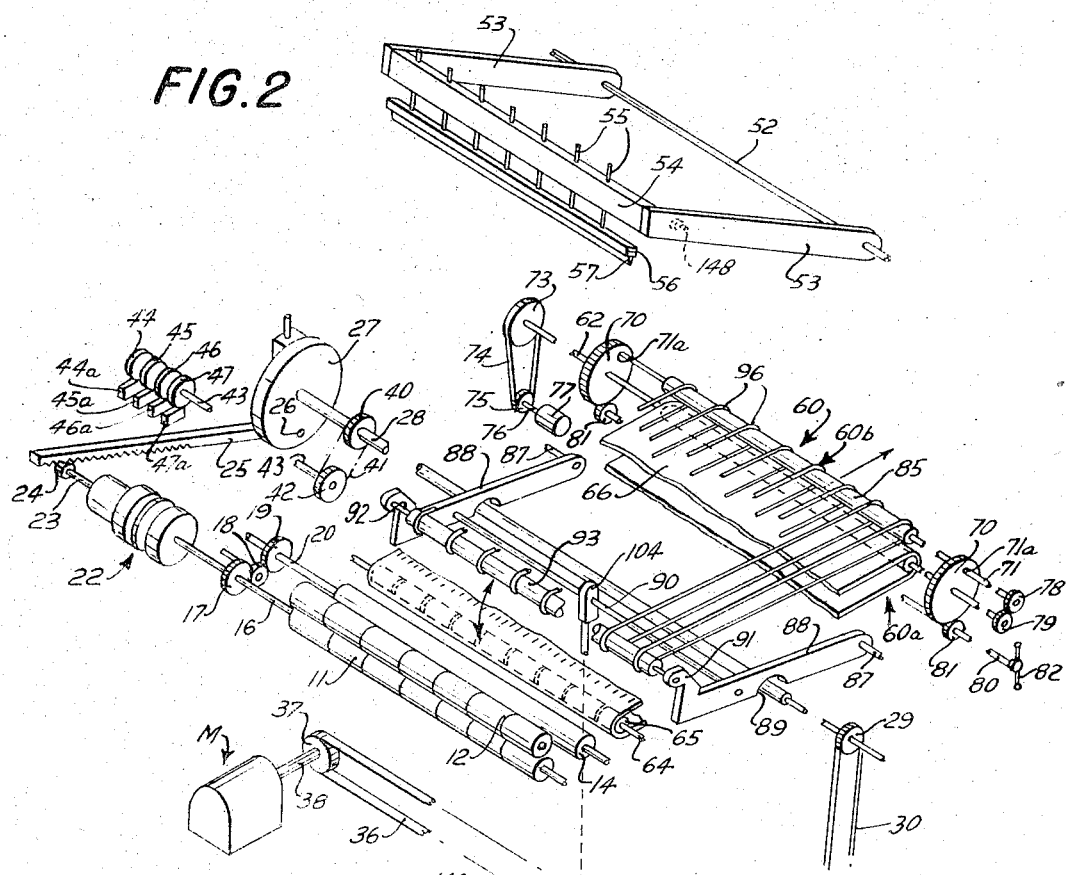
FIG. 2 is an exploded view of a conveyor mechanism and parts of the bag making machine which feed bags to the conveyor.

Referring now in detail to the drawings, 10 (FIG. 1) designates an apparatus embodying the invention. Feed rollers 11 and 12 feed a web of plastic film 13 forwardly over a platen roller 14. The web 13 is longitudinally folded along line 13c to form two superposed plies 13a and 13b the ply 13a being wider to provide a lip 13d. The roller 11 is fixed on a shaft 16 (FIG. 2) carrying a gear 17 meshing with an idler pinion 18 which in turn meshes with a gear 19 on shaft 20, the platen roller 14 being fixed on this latter shaft. Shaft 16 is connected through a combination electric clutch and brake mechanism 22 to a shaft 23. Shaft 23 carries a pinion 24 meshing with the teeth of a rack 25 pivoted at 26 to a crank disc 27. The disc 27 is fixed to a shaft 28 parallel to the shaft 16. Shaft 28 carries a sprocket wheel 29 connected by sprocket chain 30 to a sprocket wheel 31 on a shaft 32. Shaft 32 is connected through the gear box 33 to a shaft 34 extending at right angles to shaft 32. On shaft 34 is a pulley 35 connected by belt 36 to a pulley 37 on motor shaft 38 driven by an electric motor M. It will now be understood that when the motor M is energized, disc 27 will be rotated to move the rack 25 back and forth for oscillating the shaft 23. The clutch part of the mechanism 22 is so arranged that the shaft 16, and hence roller 11, will be rotated in a clockwise direction while the rack 25 is retracted, i.e., moved from left to right in FIG. 2. However, the clutch is disengaged during movement of the rack from right to left, and hence the counterclockwise rotation of shaft 23 is not transmitted to shaft 16. Furthermore, during this latter movement, the brake portion of mechanism 22 positively prevents rotation of shaft 16, either by inertia or other cause. The platen roller 14 rotates in the same direction as, but somewhat faster than, the feed roller 11.

On shaft 28 is a sprocket wheel 40 connected by sprocket chain 41 to a sprocket wheel 42 on a shaft 43. Shaft 43 carries cams 44, 45, 46, and 47 for actuating switches 44a, 45a, 46a and 47a respectively. Switch 44a controls the clutch portion of the mechanism 22; switch 45a controls the brake portion of the mechanism 22; switch 46a controls solenoids for actuating hole punchers 50 (FIG. 1) for punching holes 51 in the web, and switch 47a is in an electric eye circuit for assuring registry of printed matter on the web with the finished bags.

Mounted on the machine is a rod 52 (FIGS. 2 and 6) carrying parallel arms 53 supporting a transverse channel member 54 to which are fixed a plurality of pins 55 carrying at their lower ends an electrically heated bar 56 formed with a downwardly projecting heated sealing and severing knife 57. Suitable means, hereinafter explained, are provided for moving knife 57 in synchronization with the feed of the web over the platen roller 14. Thus, the knife 57 presses the folded web against the platen roller while the feed rollers 11 and 12 are not moving, and thereafter the knife is retracted while the feed rollers are feeding the web beyond the platen roller, thereby forming bags open at one end.

Figure 8:
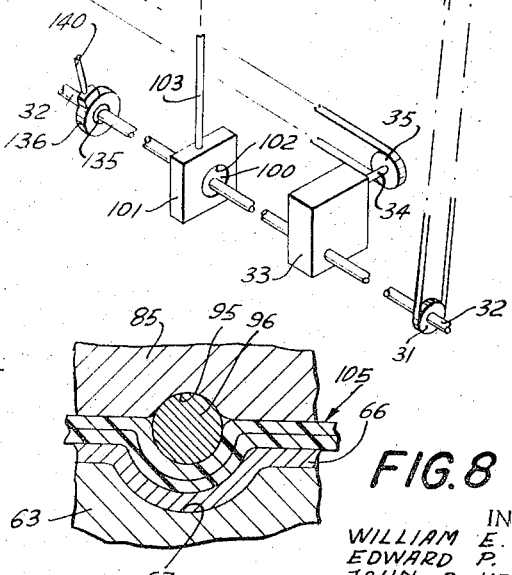
FIG. 8 is a cross-sectional view taken on line 8—8 of FIG. 7.
Figure 10:
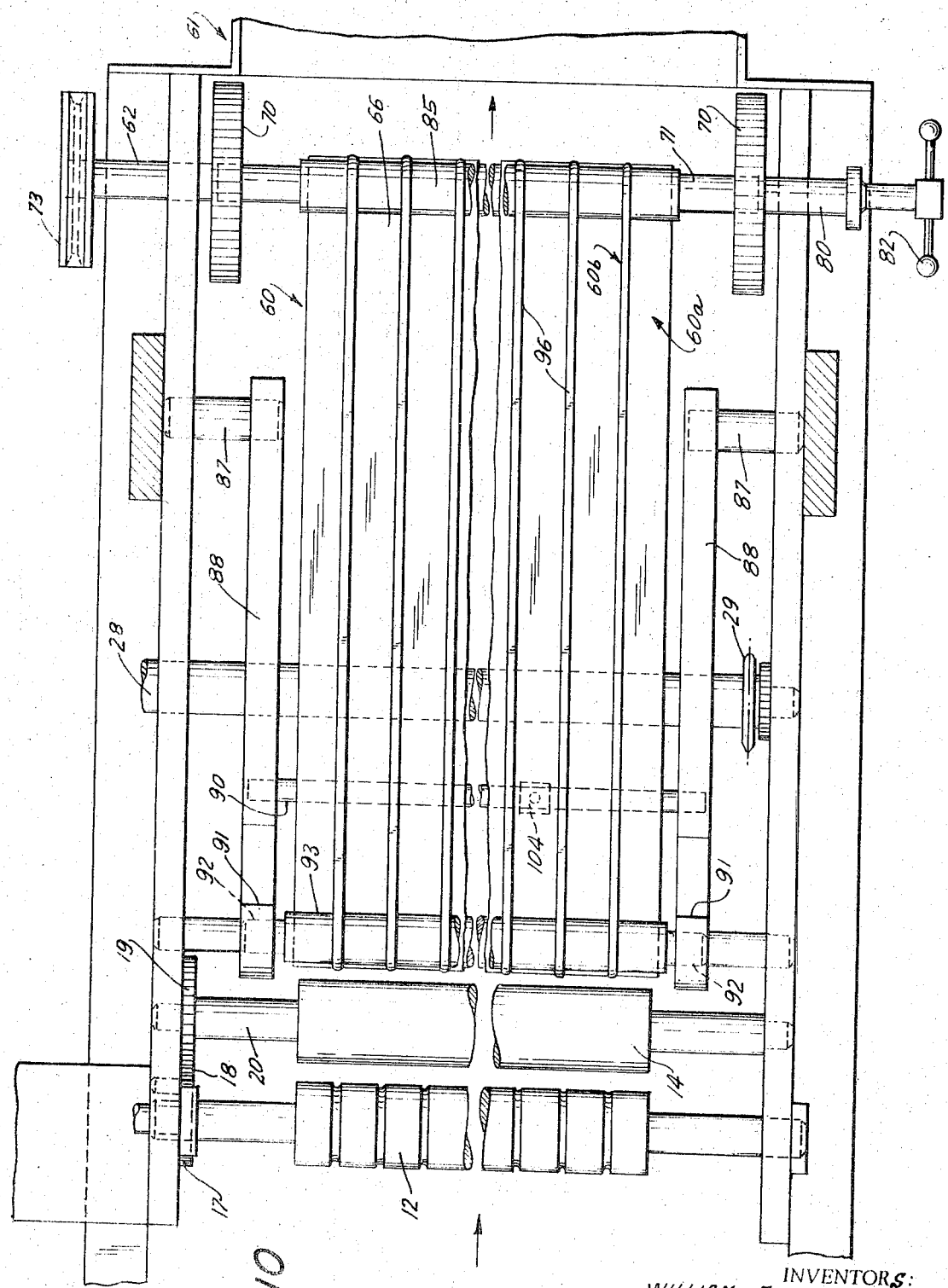
FIG. 10 is a top plan view of the conveyors.

In accordance with the present invention, conveyor means are provided to receive the formed bags and to deliver them to a stacking tray. The conveyor means for moving the formed bags is shown in FIG. 1 at 60 and the stacking tray is shown at 61. The conveyor means 60 comprises a lower conveyor 60a (FIG. 2) and an upper conveyor 60b substantially coextensive therewith. The lower conveyor 60a includes a rear shaft 62 (FIGS. 2, 6, 9, and 10), carrying a roller 63, and a front shaft 64 carrying a roller 65. Trained over the rollers 63 and 65 is a continuous broad belt 66 made of flexible, elastic sheet material. The elastic material may be the same as that of which girdles are made. The rear roller 63 is formed with a plurality of annular grooves 67 of substantially semicircular cross section, as shown in FIG. 8, the grooves being located in axially spaced-apart planes perpendicular to the roller axis. If desired the front roller 65 may be similarly grooved. 66, are a pair of similar gears 70, the shaft 62 being rotatable with respect to the gears 70. Extending through suitable openings 71a in the gears 70 is a shaft 71 offset from the shaft 62, the shaft 71 also being rotatable with respect to the gears 70. Carried by shaft 62 is a pulley 73 connected by belt 74 to a pulley 75 carried by a motor shaft 76 rotated by the motor 77. When the motor 77 is energized, shaft 62 will be rotated for moving the conveyor belt 66.

Fixed to the shaft 71, between the gears 70, is a roller 85 forming part of the upper conveyor 60b. At one end of shaft 71 is a pinion 78 meshing with a pinion 79 on one end of the shaft 62. Consequently, rotation of shaft 62 causes rotation of shaft 71 and roller 85, and hence movement of the upper conveyor. Rotatably mounted in the frame of the machine, in any suitable manner, is a shaft 80 carrying two pinions 81 meshing with gears 70. At one end of shaft 80 is a handle 82 for manually rotating said shaft. It will now be understood that when the handle 82 is rotated, the gears 70 will rotate to either raise or lower the level of the shaft 71, depending upon the direction of rotation. The shaft 71 passes loosely through said openings 71a in the gears 70 so that said shaft may be rotated relative to the gears.

Pivoted in the frame of the machine, on pins 87 (FIGS. 2, 6, and 9) are arms 88 notched at 89 so as to straddle the shaft 28. Arms 88 and 89 are interconnected rearwardly of their front ends by a reinforcing rod 90. At the forward ends of the arms 88 are forward extensions 91 supporting a cross-shaft 92. On shaft 92 is a roller 93 coextensive with the roller 65 and located at the receiving end of the conveyor. Rollers 85 and 93 are formed with annular grooves 95 (FIG. 8) aligned with the grooves 67, and of substantially semicircular cross section. Inter connecting the rollers 85 and 93, and disposed in the grooves 95 are a plurality of continuous ropes or cords 96. The ropes may be made of nylon or any other suitable, somewhat stretchable, rope material. It will be noted that the lower runs of the ropes 96 move rearwardly, as does the upper run of the belt 66, so that a bag moving between the upper and lower conveyors will be moved rearwardly.

Figure 7:
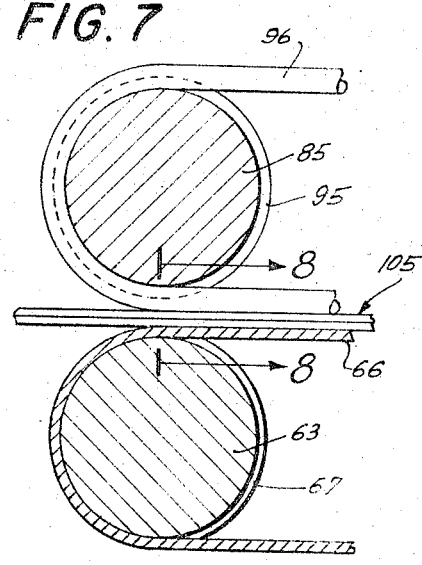
FIG. 7 is an enlarged cross-sectional view of the delivery end of the conveyors shown in FIG. 6.

The ropes 96 project radially outwardly from the grooves 95 and deform the belt 66 by pushing the latter into the grooves 67 of roller 63 (FIGS. 7 and 8), the deformation being permitted by the resilience of the belt 66. Consequently, each bag 105 is similarly deformed as it moves between the delivery ends of the conveyors defined by the rollers 63 and 85, resulting in the formation of temporary corrugations in the bag parallel to it s direction of travel. Since bags of different thicknesses may require more or less severe corrugation, adjustability of the spacing between the shafts 62 and 71, described above, permits variation of the depth to which the ropes 96 enter the grooves 67. If grooves 67 are formed in the front roller 65 of the lower conveyor, each bag will be corrugated as it enters between the receiving ends of the conveyors defined by the rollers 65 and 93, as well as when it leaves the conveyors.

Means are provided to move the front or receiving end of the upper conveyor 60b upwardly each time the heat sealing knife 57 is pressed against the platen roller 14, so that the conveyor pressure on each bag is relieved while its second side edge is formed. To this end, there is eccentrically mounted on shaft 32 a disc 100 (FIGS. 2 and 9). Mounted on the disc 100 is an adapter 101 having a round hole 102 to rotatably receive the eccentric disc 100. The hole 102 is hence also eccentric with respect to the axis of shaft 32. Fixed to the adapter 101 is a substantially vertical rod 103 pivoted at its upper end 104 to the cross-rod 90. As the shaft 32 rotates, rod 103 reciprocates up and down to raise and lower arms 88 and 89 for lifting and lowering the front roller 93 of the upper conveyor 60b. The operation is coordinated with bag feeding so that the roller 93 is lifted when a newly-made bag is being heat sealed and severed along its trailing side edge, and then after the seal has been completed, the upper conveyor moves down toward the lower conveyor to grip the bag and move it for delivery. In addition, the sealer 57 is lifted after each bag is made, in synchronism with the downward movement of roller 93, to permit delivery of bags. This synchronization results from mounting an eccentric disc 135, carrying a ring 136, on the shaft 32. Fixed to the ring 136 is a rod 130 (FIGS. 2, 6, and 9) for oscillating bars 143 mounted on a horizontal rod 144. Fixed on rod 144 are arms 145 pivoted to the lower ends of vertical members 146 formed with notches 147 to engage projections 148 mounted on the arms 53 which as heretofore described are pivoted to a horizontal rod 52.

It may be mentioned at this point that the machine has sidewalls 160 (FIG. 6) supporting a pair of parallel rods 161 and 162 to which are attached a plurality of guide fingers 161a and 162a, respectively, extending rearwardly through grooves 11a and 12a of the rollers 11 and 12. The cross-rod 144 carries bars 170 adapted to be engaged by blocking members 171, controlled by solenoids 172, for from time-to-time retaining the sealer 57 in raised position as described in our copending application Ser. No. 765,316 filed the same date as the present application.

The bags 105 are delivered to the tray 61, (FIGS. 1, and 3—5) comprising a flat, horizontal plate 110 supported by parallel brackets 111 fixed to vertical supports 112 of a frame 113. Brackets 112 are connected at their upper ends to a transverse, horizontal, tubular bar 114, and extending rearwardly from opposite ends of the bar 114 are bars 115. Plate 110 has a rear edge 116 and side edges 117. Mounted on the plate 110 adjacent the rear edge 116, and disposed centrally between the side edges 117, is a vertical bracket 118 formed with a longitudinal through opening 119. Slidably extending through the opening 119 is a horizontal rod 120 which may be fixed in adjusted position by setscrew 121. Fixed to the forward end of the rod 120 is a vertical plate 122, constituting the backwall of the tray 61. Fixed to the top of the plate 110 along its front edge, is a plate forming the front wall 109 of the tray. The front wall 109 and backwall 122 are formed with a plurality of vertical slots 109a and 122a, respectively, to allow air to pass through these walls, as will be described below.

Fixed to the top of the plate 110 adjacent one side edge 117 is another vertical bracket 123 formed with a horizontal opening through which a stem 124 slidably extends. A setscrew 124a may fix stem 124 in any desired position of adjustment. Fixed to the inner end of the stem 124 is a vertical plate 125, constituting an adjustable sidewall of the tray 61. Walls 122 may be formed with a plurality of vertical slots 122a to allow air to pass through, and thereby insure that no buildup of air pressure prevents the delivered bags from contacting the plate 122. Edges of the stack of bags 105 will also contact the guide plate 125.

A third vertical bracket 130 may be positionally fixed at any point along a slot provided in the plate 110. The bracket 130 is formed with a longitudinal opening through which a rod 131 rotatably extends, the rod 131 being above the guide plate 122. The forward end of the rod is attached to a vertical plate or gate 134 swingable from a vertical position parallel to the guide plate 125, to a raised horizontal position. The gate 134 constitutes another sidewall of the tray so that the bags 105 are stacked between the walls 109, 122, 125, and gate 134. A suitable stop is provided on bracket 130 to define the vertical position of gate 134.

Two supports, mounted on bar 114, hold a rod 150 above and behind the front wall 109 of the tray. One hook-shaped end of each of two holddown rods 151 rests on the rod 150. Each rod slants downwardly and rearwardly, and passes through one of the slots 122a in the rear wall 122. Rearwardly of the rear wall, each rod is bent through 90° at two spaced points along its length, and the endmost rod section 152 rests upon the upper edge of rear wall 122.

As each bag 105 is delivered by the conveyors, it is propelled over the front wall 109 and against the holddown rods 151, the latter serving to guide the bag downwardly into the space defined by the four tray walls. The bag settles relatively snugly within the tray walls, the slots 109a and 122a allowing air to escape from beneath the bag as it settles. A recess 110a in the top surface of the plate 110 extends from one side edge 117 of the plate to a point beneath one edge of the bag stack, and the lower edge of the gate 134 is accommodated within this recess. Upon completion of a stack of bags, the rod 131 is rotated to lift the gate 134 above the stack and permit an operator to insert his hand into recess 110a beneath the stack, grasp the stack, and remove it.

It may be mentioned that the tray 61 could be tilted so that the side edge 117 of the plate 110 along which bracket 123 is mounted is lower than the other side edge. Under such circumstances, the gate 134 may be eliminated.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A conveying means for flat articles formed of limp material, comprising:
    a. at least one conveyor including a pair of spaced-apart rollers, one of said rollers formed in its surface with axially spaced-apart annular grooves, and an endless belt of elastic material trained about said rollers, said belt being of such width that it covers a plurality of said grooves; and
    b. means adjacent to said grooved roller for pressing the portions of said belt, and any article moving along said belt, overlying said grooves into said grooves, to thereby temporarily corrugate and stiffen the article,
    c. the elasticity of said belt permitting i to be stretched and pushed into said grooves and returning said belt to flattened condition upon leaving the region between said grooved roller and pressing means (b).

2. A conveying means as defined in claim 1 wherein said pressing means (b) includes a roller parallel to said grooved roller, said parallel roller carrying means projecting from its surface in alignment with said grooves.